Dec. 25, 1962     S. M. PACE     3,070,354
COIL SPRING COMPRESSOR
Filed June 26, 1961
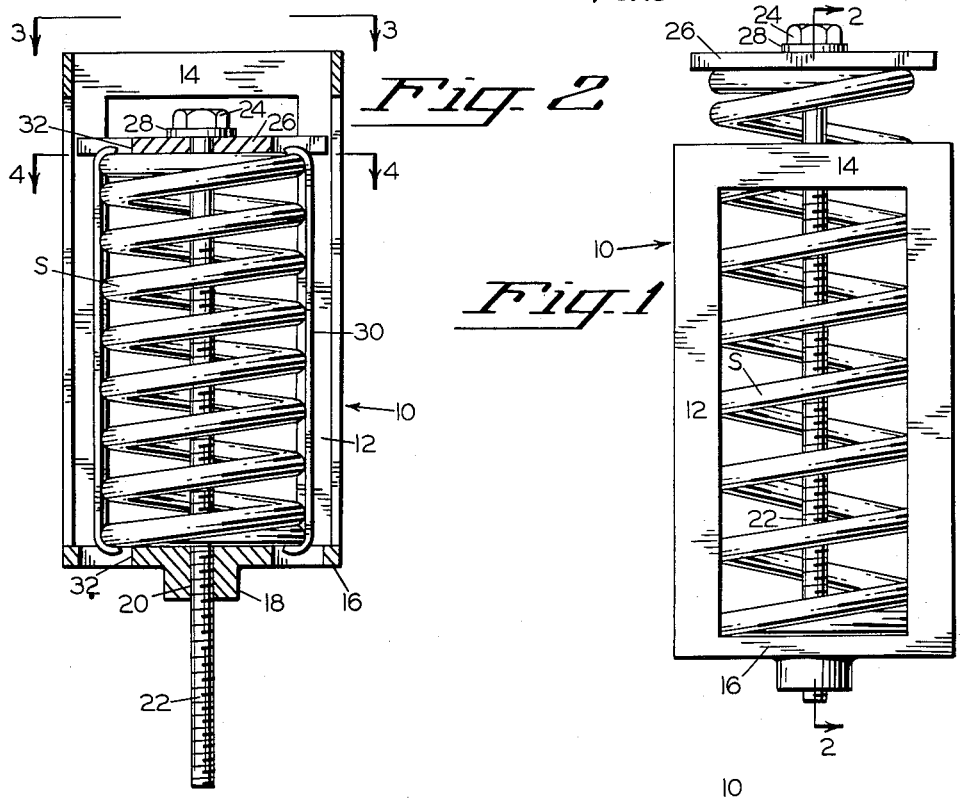
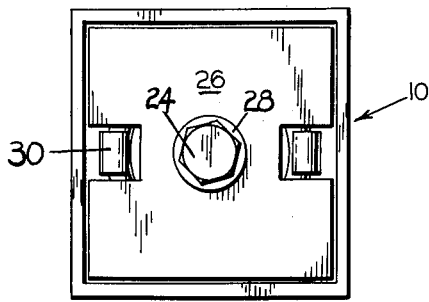
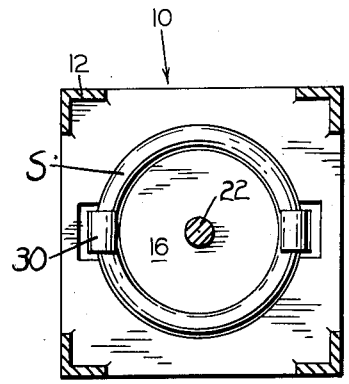
INVENTOR.
STANLEY M. PACE
BY Eugene M. Eckelman
ATTORNEY

United States Patent Office 3,070,354
Patented Dec. 25, 1962

3,070,354
COIL SPRING COMPRESSOR
Stanley M. Pace, 6916 SW. 35th Ave., Portland, Oreg.
Filed June 26, 1961, Ser. No. 119,563
2 Claims. (Cl. 254—10.5)

This invention relates to a coil spring compressor and more particularly pertains to a device for compressing heavy duty coil springs such as the type utilized in the front end suspensions of automobiles.

In the repair or assembly of front end suspensions of automobiles or other vehicles it is necessary that the upright coil springs, now commonly used, be removed and reinserted. For the purpose of reinserting these springs they first must be compressed for positioning in the front end structure of the vehicle. Such heavy duty springs are difficult to compress and now commonly are placed in a drill press and compressed to a point at which hooks may be applied between spaced coils thereof for holding the spring in compressed relation. Such is an extremely dangerous operation since the springs may accidentally dislodge from the drill press and eject themselves with considerable force in any direction.

It is therefore a primary object of the present invention to provide a simplified and portable spring compressor which is convenient in use and confines the spring in a manner whereby it cannot be released accidentally.

It is a further object to provide a spring compressor of the type described having improved structure for the application of spring holding hooks or straps.

The invention will be better understood and additional objects thereof will become more apparent from the accompanying specification and claims considered together with the accompanying drawings, wherein like numerals of reference indicate like parts, and wherein:

FIGURE 1 is a side elevational view of the present invention showing a spring mounted therein prior to compression;

FIGURE 2 is a sectional view taken on the line 2—2 of FIGURE 1 and showing a spring as compressed by the present device;

FIGURE 3 is a top plan view taken on the line 3—3 of FIGURE 2; and

FIGURE 4 is a sectional view taken on the line 4—4 of FIGURE 2.

Referring now particularly to the drawings, the present device comprises a cage 10 which in a preferred construction has corner angle irons 12 secured together at the upper end by peripheral frame members 14. It is apparent that the cage 10, comprising the angled corners 12 and the connecting frame members 14 may be cast as an integral unit but it is to be understood that the members 14 may be suitably welded to said corner members.

The cage 10 is thus open at its upper end through which a spring S may be inserted for the purpose of compressing it as will be seen.

Cage 10 has an integral bottom wall 16 provided with a boss or projection 18 having a longitudinally extending threaded bore 20. Threadedly received in bore 20 is an elongated screw 22 carrying at its upper end an integral head 24 for the engagement thereby of a suitable wrench for threadedly moving the screw relative to the cage.

Freely mounted on the upper end of screw 22 is a bearing plate 26 and a bearing washer 28 intermediate said plate and the head 24. Plate 26 preferably assumes the inner shape of the cage 10 and is dimensioned to move freely within the cage. It is confined therein by the angle construction of the upright cage members 12 which thus form guide tracks for movement of said plate.

To compress a spring S, the screw 22 is first completely removed from the boss 18 by retracting movement and the spring is placed thereon whereupon the screw is then reinserted in the boss 18 and threaded inwardly by means of a suitable wrench engaging the nut 24 to a desired position of spring compression. Suitable hooks 30 are then engaged with spaced coils of the springs to hold the latter in a compressed condition. These hooks may be of a selected length for accommodating common lengths of springs, the same being true of the cage 10 and screw 22.

FIGURE 1 shows a spring initially inserted in the cage for compression and FIGURE 2 shows a spring in fully compressed condition and with the hooks 30 applied.

In order that substantially all of the coils of the spring may be spanned by a hook in order that the spring will be compressed in its overall length, it is a feature of the present invention to provide apertures or slots 32 in either one or both of the upper plate 26 and lower bottom wall 16 whereby hook lengths may be used which span the entire spring Thus, once the spring is compressed it will not lengthen out due to the end coils not being engaged by hooks.

Thus, according to the present invention a device is provided which simplifies the step of compressing a coil spring for insertion into a front end suspension. In compressing the spring it is confined within the cage 10 and in no way can it be accidently dislodged to create a dangerous condition for adjacent workmen. The device is inexpensive to manufacture and is convenient in use, and thus overcomes a serious problem now existing in garages or body shops for the placement of such springs in vehicle suspensions.

It is to be understood, however, that the invention may take other forms and all such modifications and variations within the scope of the appended claims which will occur to persons skilled in the art are included in the invention.

Having now described my invention and in what manner the same may be used, what I claim as new and desire to protect by Letters Patent is:

1. A device for compressing heavy duty springs comprising a cage having a bottom wall and integral, elongated corner frame members, said cage being rectangular in cross section, the upper end of the cage being open to receive a spring to be compressed while confined within the cage, a nut on said bottom wall, an elongated screw engageable with said nut and adapted to receive a spring for compressing it against said bottom wall, a bearing plate freely mounted on the upper end of said screw and being guided for slidable movement interiorly of said cage by said corner frame members, and at least one hook member adapted to engage spaced coils of the spring for holding the latter in compressed condition.

2. The compressing device of claim 1 wherein one of said bottom wall and bearing plate has an opening for the reception of a portion of a spring holding hook.

References Cited in the file of this patent

UNITED STATES PATENTS

| 1,114,601 | Gerderes | Oct. 20, 1914 |
| 1,389,657 | Harsley et al. | Sept. 6, 1921 |

FOREIGN PATENTS

| 234,229 | Great Britain | May 18, 1925 |
| 641,725 | Great Britain | Aug. 16, 1950 |